United States Patent
Nanri et al.

(10) Patent No.: US 8,867,790 B2
(45) Date of Patent: Oct. 21, 2014

(54) OBJECT DETECTION DEVICE, OBJECT DETECTION METHOD, AND PROGRAM

(75) Inventors: Takuya Nanri, Kanagawa (JP);
Kensuke Maruya, Osaka (JP);
Hirofumi Nishimura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 98 days.

(21) Appl. No.: 13/813,832

(22) PCT Filed: Aug. 3, 2011

(86) PCT No.: PCT/JP2011/004394
§ 371 (c)(1),
(2), (4) Date: Feb. 1, 2013

(87) PCT Pub. No.: WO2012/017650
PCT Pub. Date: Feb. 9, 2012

(65) Prior Publication Data
US 2013/0129148 A1   May 23, 2013

(30) Foreign Application Priority Data

Aug. 3, 2010   (JP) ................. 2010-174524

(51) Int. Cl.
| G06K 9/00 | (2006.01) |
| G01B 11/00 | (2006.01) |
| G01B 11/24 | (2006.01) |
| G06T 7/00 | (2006.01) |
| G08G 1/16 | (2006.01) |
| G01C 21/36 | (2006.01) |

(52) U.S. Cl.
CPC ............ *G06K 9/00201* (2013.01); *G01B 11/00* (2013.01); *G01B 11/24* (2013.01); *G06T 7/0097* (2013.01); *G08G 1/166* (2013.01); *G01C 21/3602* (2013.01); *G06T 7/0081* (2013.01); *G06T 2207/10012* (2013.01); *G06T 2207/30261* (2013.01); *G06K 9/00805* (2013.01)
USPC ........................................................ 382/103

(58) Field of Classification Search
None
See application file for complete search history.

(56) References Cited

U.S. PATENT DOCUMENTS

2005/0264557 A1   12/2005   Kise

FOREIGN PATENT DOCUMENTS

| JP | 2005-346297 A | 12/2005 |
| JP | 2006-234682 A | 9/2006 |
| JP | 2008-033750 A | 2/2008 |

OTHER PUBLICATIONS

International Search Report for Application No. PCT/JP2011/004394 dated Nov. 15, 2011.

*Primary Examiner* — Stephen R Koziol
*Assistant Examiner* — Amandeep Saini
(74) *Attorney, Agent, or Firm* — Pearne & Gordon, LLP

(57) ABSTRACT

An object detection device that can accurately identify an object candidate in captured stereo images as an object or a road surface. The object detection device (100) have a disparity map generator (120) that generates a disparity map based on the stereo images; a road surface estimator (130) that estimates a road surface based on the disparity map; an object candidate location extractor (140) that extracts an object candidate region above the road surface, based on the disparity map and the road surface; an object identifying region extractor (150) that extracts an object identifying region including a region around the object candidate region; a geometric feature extractor (160) that extracts a geometric feature of the object candidate based on the object identifying region; and an object identifying unit (170) that identifies whether the object candidate is an object or a road surface based on the geometric feature.

13 Claims, 16 Drawing Sheets

DISPARITY MAP

OBJECT CANDIDATE LOCATION

DISPARITY MAP AFTER CUTTING OUT REGION

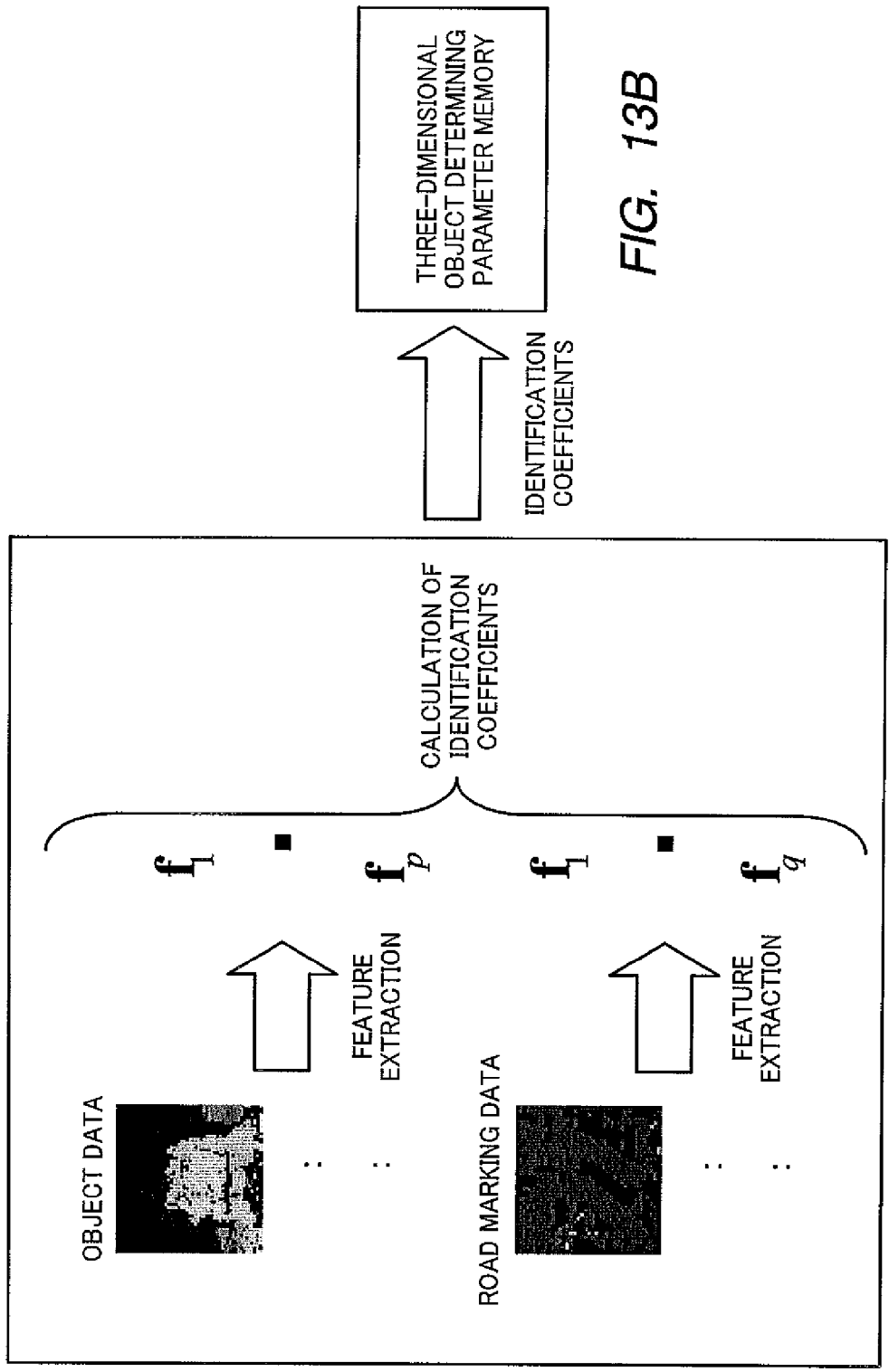

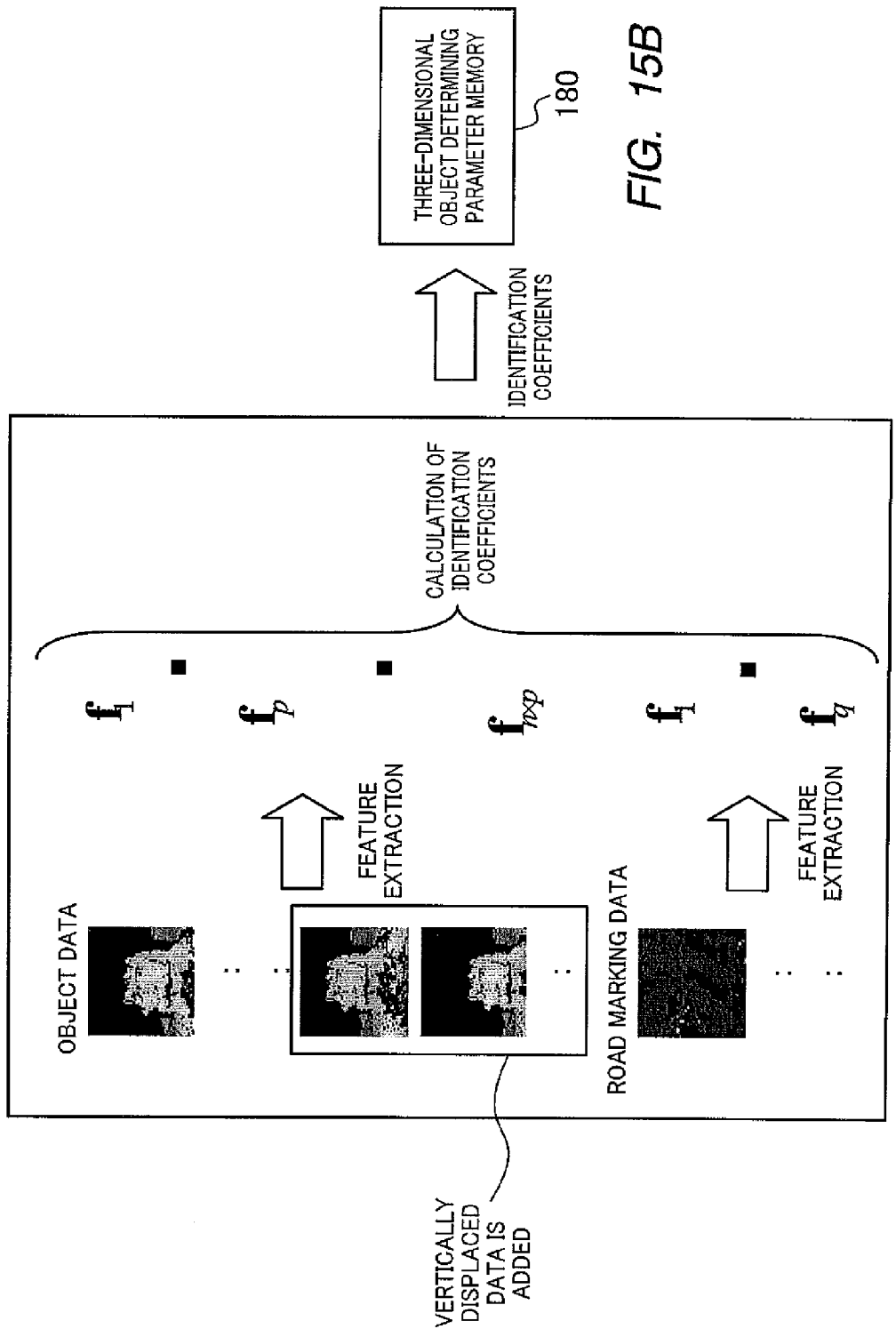

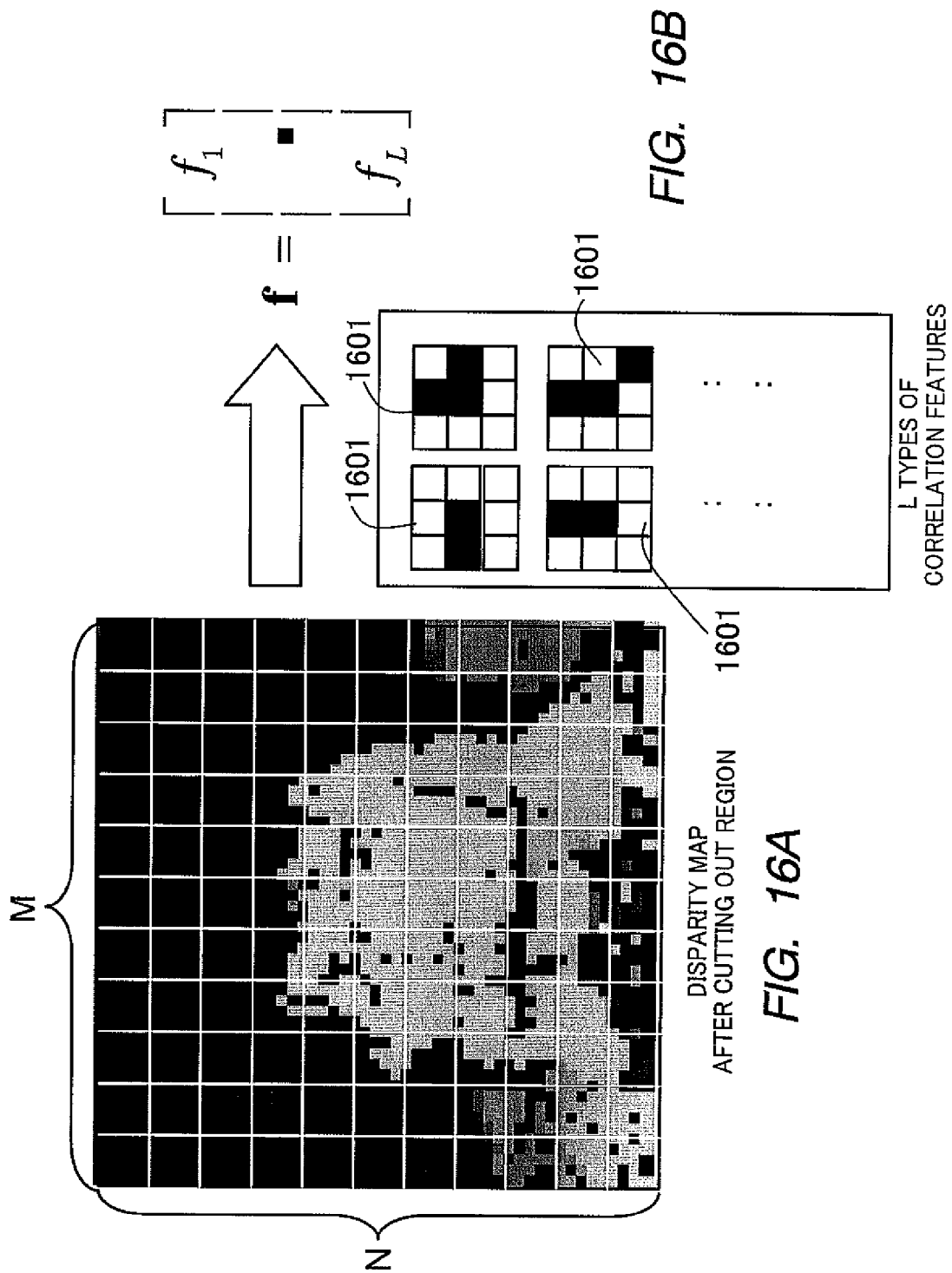

OBJECT DETECTION DEVICE, OBJECT DETECTION METHOD, AND PROGRAM

TECHNICAL FIELD

The present invention relates to a device, a method, and a program for detecting an object in a captured stereo image.

BACKGROUND ART

An object detecting device has been known that calculates a displacement (disparity) between stereo images (a target image and a reference image) by stereo matching of the target image and the reference image, and detects an object on the basis of the calculated disparity. An example application under study of the object detecting device is a system that can detect objects (i.e., three-dimensional objects such as vehicles and pedestrians other than the road surface) and road surfaces, in stereo images, captured by a vehicle-mounted camera, of a view in front of a vehicle.

A proposed conventional object detecting device calculates the slope of the height direction of the object candidate captured in the stereo images, and identifies as a real object or a road surface from the calculated slope (see PTL 1, for example).

FIG. 1 is a block diagram illustrating the configuration of an object detecting device described in PTL 1.

As shown in FIG. 1, object detecting device 10 includes stereo image acquiring unit 11, disparity map generator 12, road surface estimator 13, object candidate location extractor 14, and slope calculating and determining unit 15.

Stereo image acquiring unit 11 acquires a pair of stereo images that are simultaneously captured by a stereo camera having two lenses arranged horizontally.

Disparity map generator 12 generates a disparity map on the basis of the stereo images acquired by stereo image acquiring unit 11. The disparity map is obtained through calculation of a displacement (disparity) between a target image and a reference image for every pixel by stereo matching.

Road surface estimator 13 estimates a road surface on the basis of the disparity map generated by disparity map generator 12.

Object candidate location extractor 14 extracts regions where spaces above the road surface estimated by road surface estimator 13 in a real space are imaged, on the basis of the disparity map generated by disparity map generator 12. Object candidate location extractor 14 classifies the extracted regions into groups, the extracted regions of each group having approximate disparity values, and extracts regions looking like objects (referred to hereafter as "object candidates") from the stereo images.

Slope calculating and determining unit 15 calculates the slope of the disparity in the vertical direction of the region where the object candidate extracted by object candidate location extractor 14 (i.e., the slope in the height direction of the object candidate) is imaged, on the basis of the disparity map generated by disparity map generator 12, and identifies the object candidate as a real object or a road surface. Specifically, slope determining unit 15 determines that the object candidate is a real object if the slope of disparity is greater than a predetermined threshold, while it determines that the object candidate is a road surface if the slope of disparity is less than the predetermined threshold.

A target identifying device described in PTL 2 calculates the deviation of disparity values in a depth direction and the deviation of disparity values in a vertical direction on the basis of the disparity of the region of the stereo images where an object candidate is captured, and identifies the object candidate as a real object or a road surface.

CITATION LIST

Patent Literature

PTL 1 Japanese Patent Application Laid-Open No. 2008-033750
PTL 2 Japanese Patent Application Laid-Open No. 2006-234682

SUMMARY OF INVENTION

Technical Problem

However, the conventional object detecting devices may misidentify road markings (such as figures indicating the maximum speed) painted on a distant road surface as an object. This is because the disparity calculation of a region where a distant object is imaged is less accurate in the stereo images, so that it is difficult to accurately calculate the slope in a height direction of the distant object.

An object of the present invention is to provide a device, a method, and a program that accurately identify an object candidate in captured stereo images as a real object or a road surface.

Solution to Problem

According to the present invention, an object detecting device that detects an object on a road surface included in stereo images includes a disparity map generator for generating a disparity map on the basis of the stereo images; a road surface estimator for identifying a road surface region on the basis of the disparity map; an object candidate location extractor for extracting pieces of disparity data above the road surface region from the disparity map as an object candidate region where an object candidate is present; an object identifying region extractor for extracting an object identifying region including the object candidate region and a peripheral region of the object candidate region from the disparity map; a feature extractor for extracting a geometric feature in the object identifying region; and an object identifying unit for identifying whether the object candidate is an object or a road surface on the basis of the geometric feature.

According to the present invention, an object detecting method that detects an object on a road surface included in stereo images includes the steps of: generating a disparity map on the basis of the stereo images using a disparity map generator; identifying a road surface region on the basis of the disparity map using a road surface estimator; extracting pieces of disparity data above the road surface region from the disparity map as an object candidate region where an object candidate is present using an object candidate location extractor; extracting an object identifying region including the object candidate region and a peripheral region of the object candidate region from the disparity map using an object identifying region extractor; extracting a geometric feature of the object identifying region using a feature extractor; and identifying whether the object candidate is an object or a road surface on the basis of the geometric feature using an object identifying unit.

Advantageous Effects of Invention

According to the present invention, the object candidate in the captured stereo images can be accurately identified as a real object or a road surface.

BRIEF DESCRIPTION OF DRAWINGS

FIG. 13 illustrates a method of learning an object determining parameter stored in an object determining parameter memory of the object detecting device according to Embodiment 1;

FIG. 15 illustrates a method of learning the object determining parameter stored in the object determining parameter memory of the object detecting device according to Embodiment 1 by dealing with a vertical displacement; and FIG. 16 illustrates a process of extracting correlation features in the feature extractor of the object detecting device according to Embodiment 2 of the present invention.

DESCRIPTION OF EMBODIMENTS

The embodiments of the present invention will now be described in detail with reference to the attached drawings.

Embodiment 1

Figure 1:
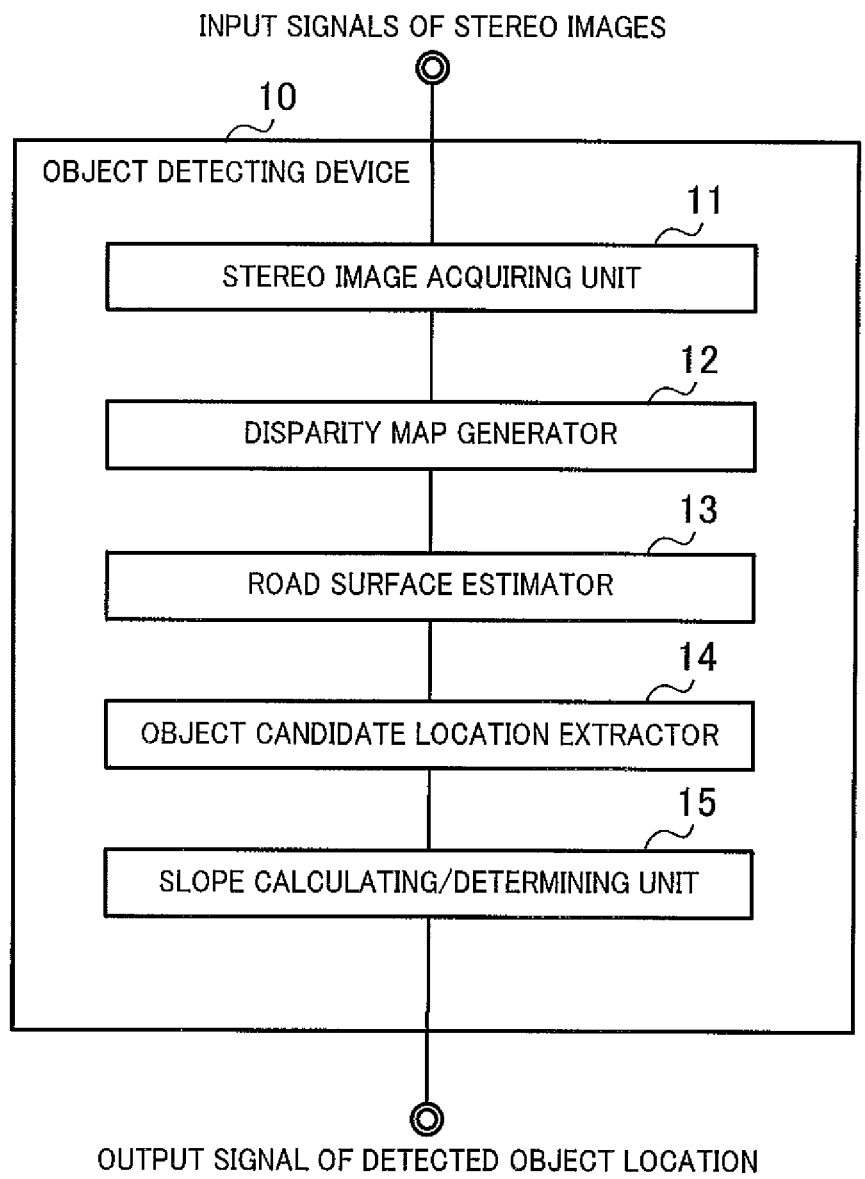
FIG. 1 is a block diagram illustrating an object detecting device according to PTL 1.
Figure 2:
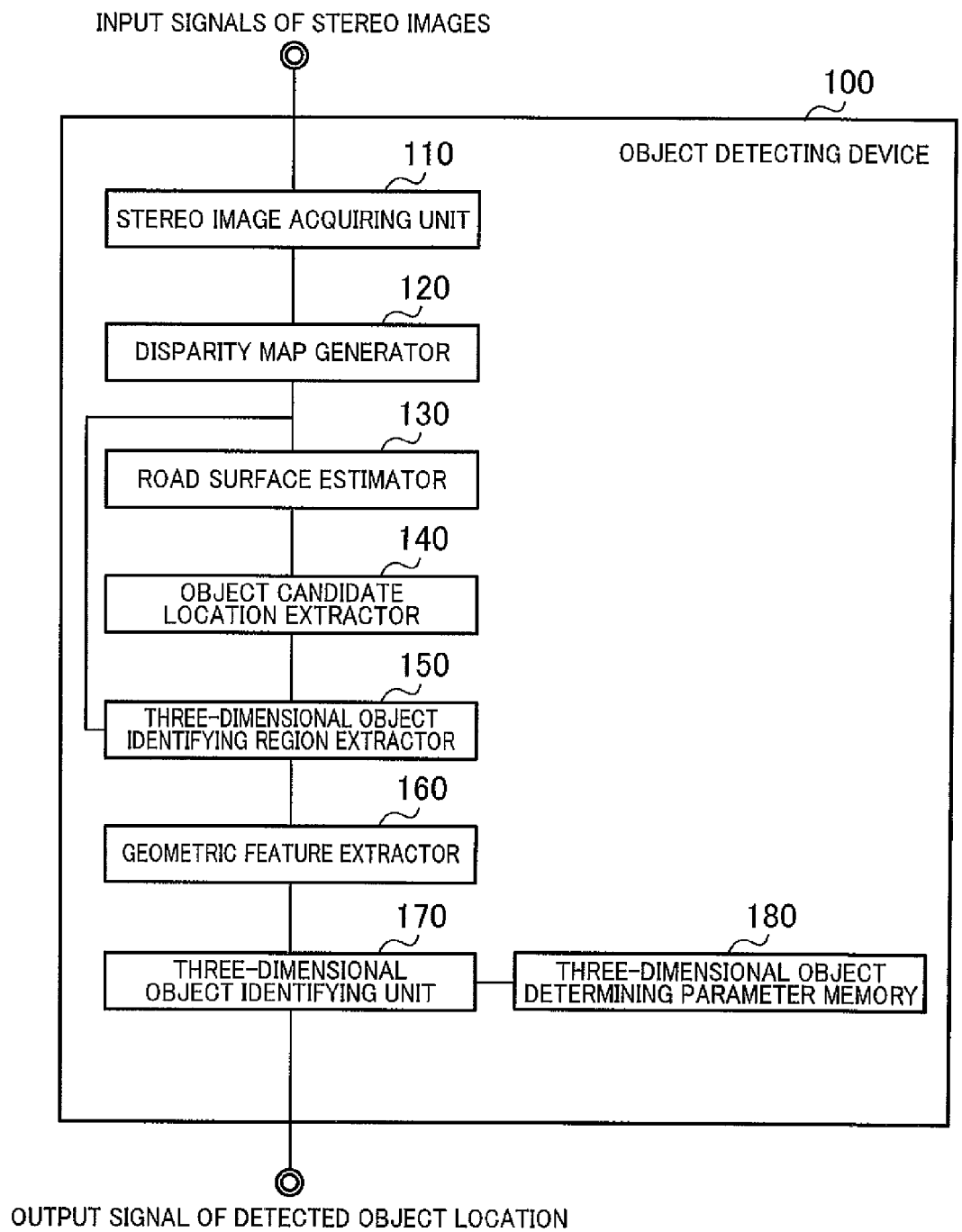
FIG. 2 is a block diagram illustrating the configuration of an object detecting device according to Embodiment 1 of the present invention.

FIG. 2 is a block diagram illustrating the configuration of an object detecting device according to Embodiment 1 of the present invention. The present embodiment is an example applied to an object detecting device which detects object candidates in a road environment (i.e., three-dimensional objects such as vehicles and pedestrians other than a road surface) in front of a vehicle using a stereo camera mounted on the vehicle.

As shown in FIG. 2, object detecting device 100 includes stereo image acquiring unit 110, disparity map generator 120, road surface estimator 130, object candidate location extractor 140, object identifying region extractor (three-dimensional object identifying region extractor) 150, feature extractor 160, object identifying unit (three-dimensional object identifying unit) 170, and object determining parameter memory (three-dimensional object determining parameter memory) 180.

Stereo image acquiring unit 110 acquires stereo images from an imaging unit (not shown) such as a stereo camera. The imaging unit has a first imaging system and a second imaging system, and captures stereo images consisting of a target image acquired by imaging a target using the first imaging system and a reference image acquired by imaging the target using the second imaging system, to output the stereo images to stereo image acquiring unit 110.

Disparity map generator 120 generates a disparity map on the basis of the stereo images acquired by stereo image acquiring unit 110.

Road surface estimator 130 estimates a road surface in the stereo images on the basis of the disparity map generated by disparity map generator 120.

Object candidate location extractor 140 extracts, from the stereo images, a region of an object candidate (referred to hereafter as an "object candidate region") above the road surface in the disparity map, on the basis of the disparity map generated by disparity map generator 120 and the road surface estimated by road surface estimator 130.

Object identifying region extractor 150 extracts a region including the object candidate region and a peripheral region of the object candidate region as an object identifying region on the basis of the disparity map generated by disparity map generator 120.

Feature extractor 160 extracts image features in the object identifying region as a geometric feature in the object candidate.

Object determining parameter memory 180 stores object determining parameters that are the results of learning multiple geometric features in objects and road surfaces (e.g. road markings).

Object identifying unit 170 identifies the object candidate as a real object or a road surface on the basis of the geometric feature in the extracted object candidate and the object determining parameters stored in advance in object determining parameter memory 180 to output the results of identification.

The operation of object detecting device 100 will now be explained for each unit.

(Stereo Image Acquiring Unit 110)

Stereo image acquiring unit 110 acquires stereo images that are captured by the stereo camera having two camera systems (imaging systems) arranged horizontally. The stereo images consist of a target image captured by one camera and a reference image captured by the other camera. The stereo camera uses an image sensor such as a charge coupled device (CCD) or a complementary metal oxide semiconductor (CMOS) for imaging.

Figure 3B:
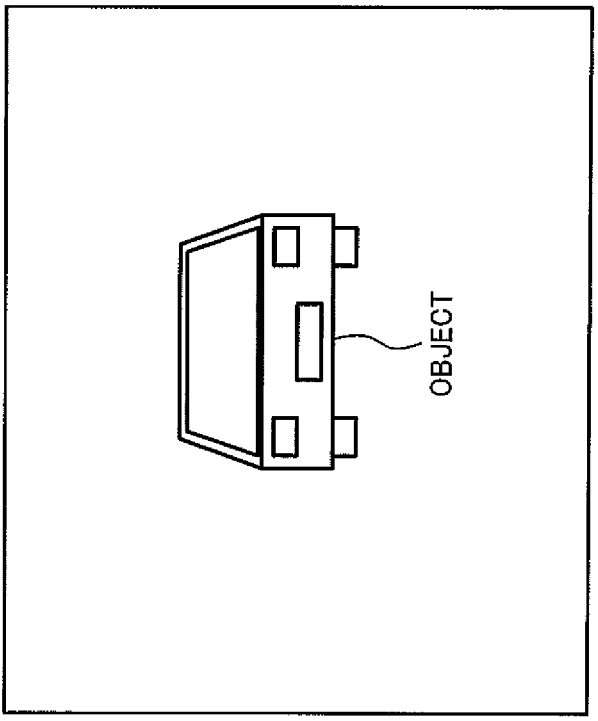
FIG. 3 is a schematic view of stereo images of a vehicle in front of a host vehicle that are captured by a stereo camera, mounted on the vehicle, of an object detecting device according to Embodiment 1.
Figure 3A:
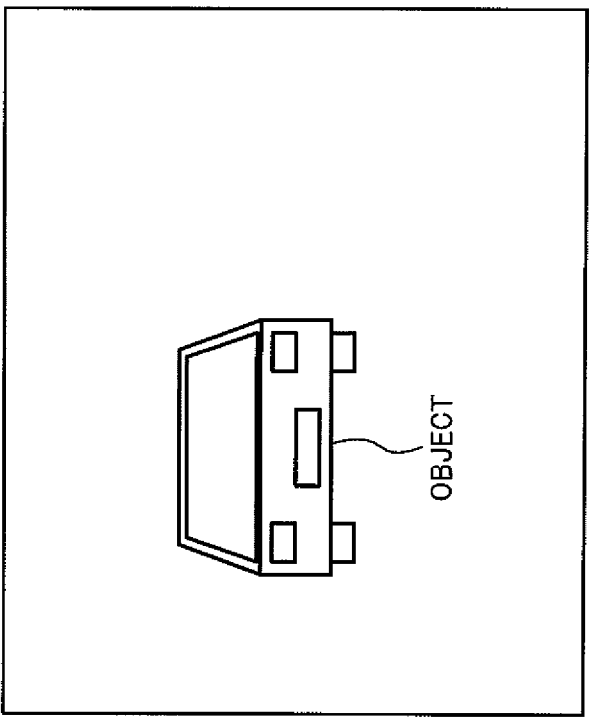

FIG. 3 includes schematic views of stereo images of a vehicle of interest in front of a host vehicle, the stereo images being captured, for example, by a stereo camera mounted in the host vehicle. FIG. 3A and FIG. 3B show the target image and the reference image, respectively.

The target image may be either of the right or left stereo image. In the following explanation for convenience, the target image is one captured by the right camera, and the reference image is another one captured by the left camera, the cameras facing the target.

The stereo images acquired by stereo image acquiring unit 110 are subjected to the correction of distortion by lenses and for collimation of optical axes. The correction of distortion by the lenses is achieved, for example, by a method based on a correction conversion table using design values of the lenses or a method based on parameter estimation using a radial distortion model.

The correction for collimation of the optical axes is achieved by various processes, for example, a process that involves capturing a target image and a reference image of a plate having a grid pattern, correlating the coordinates of the right and left cameras of the same grid points to calculates a relative positional relationship between the right and left cameras, and corrects the optical axes by collimation on the basis of the calculated positional relationship.

The stereo camera equipped with two horizontally arranged lenses has been described. Alternatively, the stereo camera may have any other configuration on the two imaging systems, for example, two vertically arranged imaging systems.

(Disparity Map Generator 120)

Disparity map generator 120 receives the stereo images from stereo image acquiring unit 110. Disparity map generator 120 estimates a displacement (disparity) between the target image and the reference image for every pixel by stereo matching to generate a disparity map. The disparity map includes three-dimensional information that contains a distance axis in addition to the X-axis and the Y-axis.

Figure 4B:
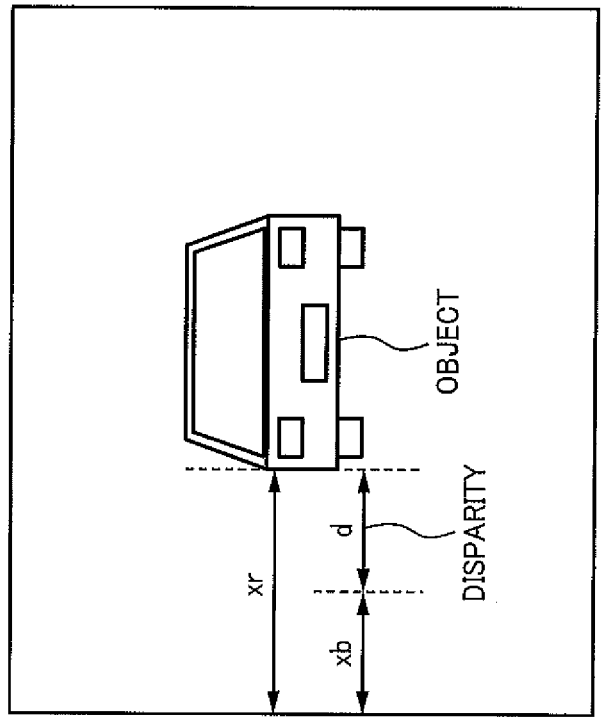
FIG. 4 is a schematic diagram for explaining a method of generating a disparity map in a disparity map generator of the object detecting device according to Embodiment 1.
Figure 4A:
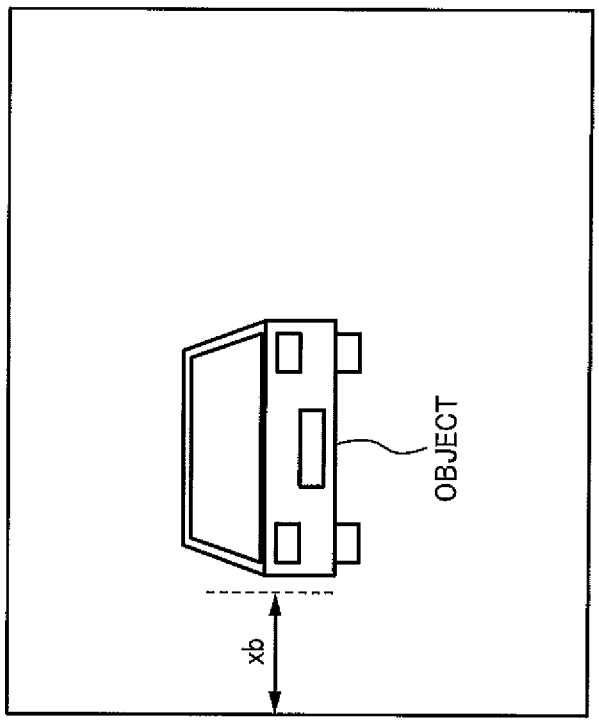

FIG. 4 is a schematic diagram for explaining the generation of the disparity map, which illustrates the stereo images of the vehicle of interest in front of the camera. FIGS. 4A and 4B illustrate the target image and the reference image, respectively.

The disparity is represented by the displacement in location of the vehicle of interest between the target image and the reference image. The disparity depends on the distance between the stereo camera and a target to be imaged (an object (vehicle) in FIG. 4), the disparity being smaller at a longer distance. The disparity "d" at the left edge of the imaged target is represented by the difference between the coordinates (i.e., "xr–xb"), where "xb" is the coordinate of the left edge of the imaged target in the target image and "xr" is the coordinate of the left edge of the imaged target in the reference image.

FIG. 5 illustrates a process of generating a disparity map in disparity map generator 120. FIG. 5A illustrates the scan of pixel which is a target for the calculation of the disparity (referred to hereinafter as a "disparity calculating point") in the target image. In FIG. 5A, the disparity calculating point is shifted every pixel from a pixel at the upper left corner to the right of the scanning area in the target image. When the disparity calculating point reaches the right edge of the area, it is moved down by one line to a pixel at the left edge, and the disparity calculating point is repeatedly shifted every pixel to the right as mentioned above. FIG. 5B illustrates a search region which is searched for a pixel corresponding to the disparity calculating point in the reference image (referred to hereinafter as a "corresponding point"). FIG. 5C indicates the degree of difference between the brightness of the disparity calculating point in the target image and brightness of each pixel within the search area in the reference image. In FIG. 5C, the pixel having the lowest degree of difference in brightness is the corresponding point. While the disparity calculating point is described as a single pixel in the target image, it may consist of multiple pixels.

Disparity map generator 120 scans the disparity calculating points over the entire target image to estimate the disparity for pixels of the entire target image, and generates the disparity map (FIG. 5D) that indicates a two-dimensional array of disparities of pixels of the target image. The disparity calculating points scanned over the entire image are described. Alternatively, image scanning can be performed only over a required region; for example, only over a region including a road surface in a real space and a space above the road surface. FIG. 5D represents the disparity map by a color depth, where a deeper color indicates a smaller disparity (i.e., it is more distant to the imaged target).

The search region for the corresponding points in the reference image is established in reference to at least the coordinate of the disparity calculating point and an epipolar line. The epipolar line is determined by projecting the optical axis of one camera onto an image captured by the other camera, and represents the geometric relationship between the two cameras.

Figure 5A:
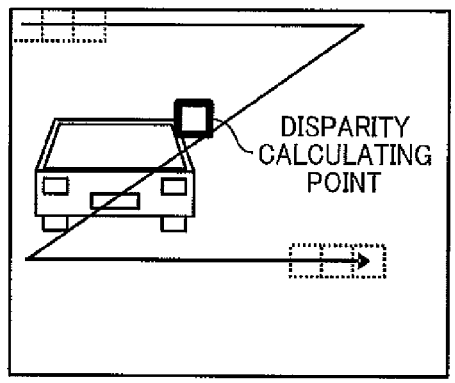
FIG. 5 illustrates the method of generating the disparity map in the disparity map generator of the object detecting device according to Embodiment 1.
Figure 5B:
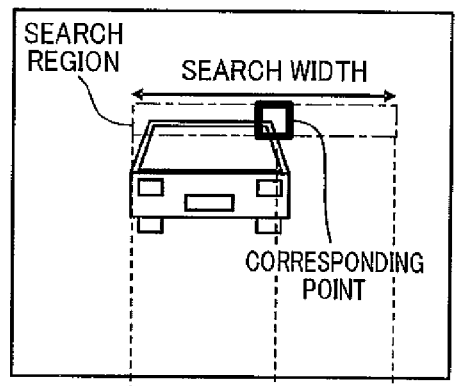
Figure 5C:
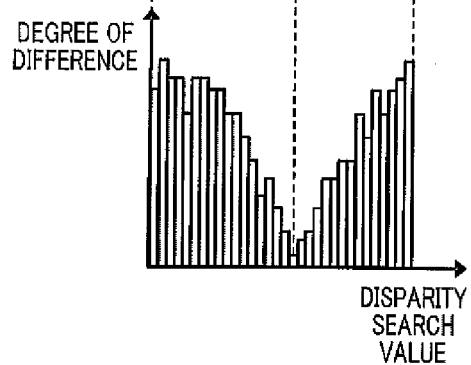
Figure 5D:
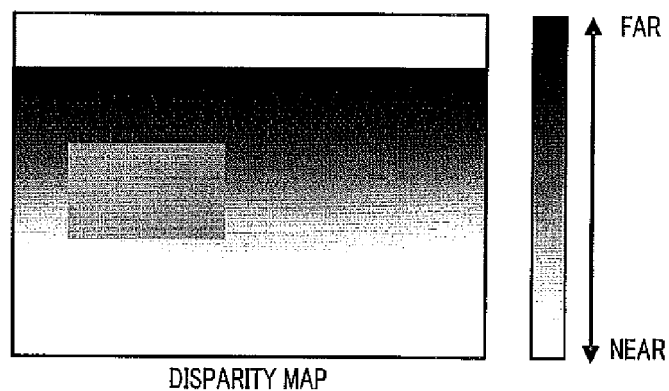

In FIG. 5C, the abscissa axis indicates a disparity search value corresponding to a distance from each pixel within the search region to a pixel at the left edge of the search region, and the ordinate axis indicates the degree of difference between the brightness of the disparity calculating point and the brightness of each pixel within the search area. The degree of difference between the brightness of the disparity calculating point and the brightness of each pixel within the search area is the sum of absolute differences (SAD) between the brightness of a region of 8×8 pixels around the disparity calculating point and the brightness of a region of 8×8 pixels around each pixel within the search area. The pixel having the lowest degree of difference within the search area is the corresponding point, and the displacement between the point of the disparity calculating point in the target image and the point of the corresponding point in the reference image is the disparity.

In the above description, the region for calculation of the degree of difference is 8×8 pixels. Instead, the region can have any rectangular size without restriction. The degree of difference has been described with brightness, it can be described with any other parameter.

Furthermore, the degree of difference can be calculated by any process, such as the sum of squared differences (SSD), where the smallest value is obtained when two values for calculation of the degree of difference match exactly. The degree of difference may also use a similarity index after sign inversion, such as normalized cross correlation (NCC), where the similarity index is the largest in the case of perfect matching.

(Road Surface Estimator 130)

Road surface estimator 130 estimates a road surface (road surface region) on the basis of the disparity map generated by disparity map generator 120. The road surface region may be represented on the basis of the target image or the reference image, or may be represented on the disparity map.

Figure 6:
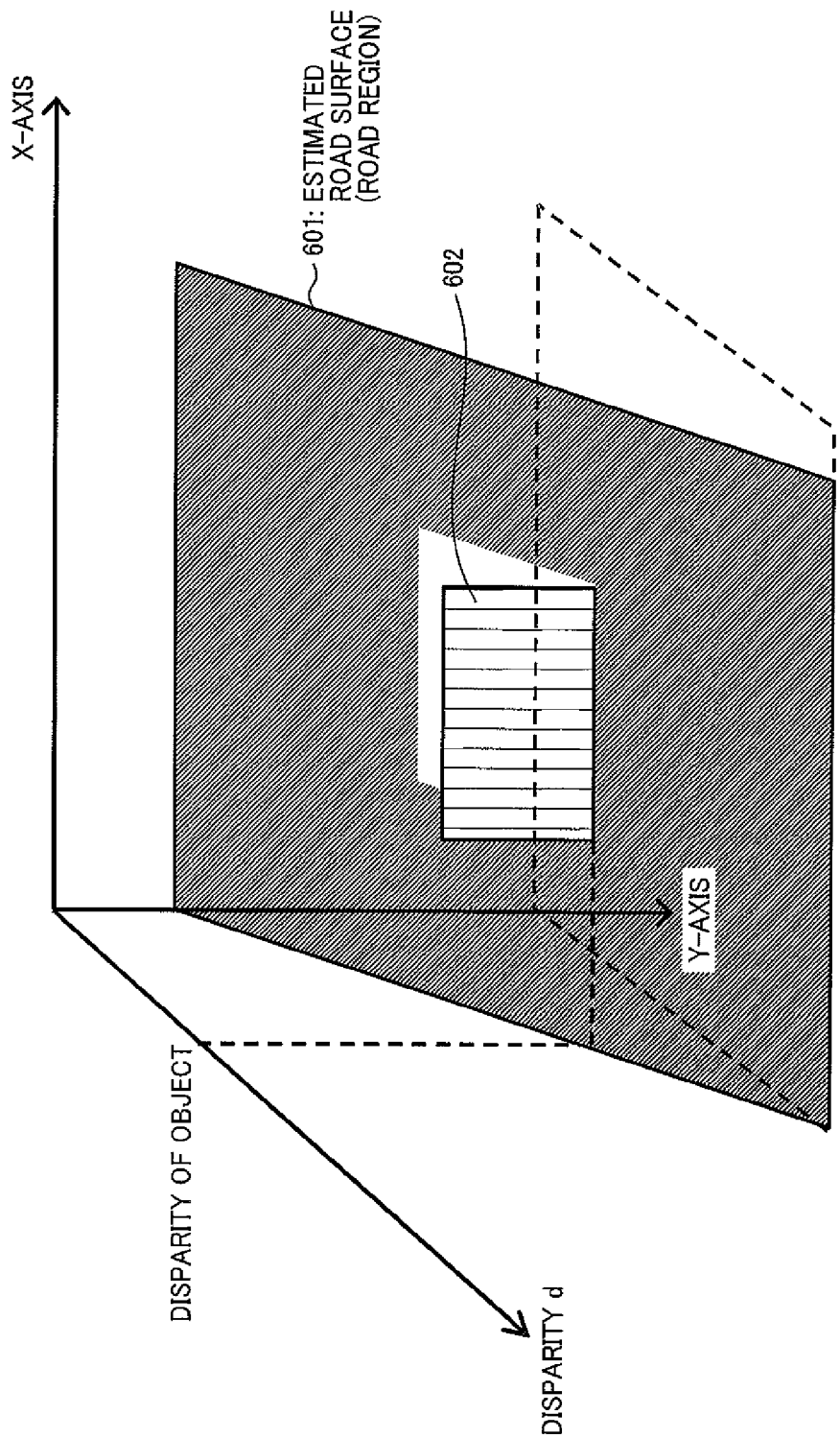
FIG. 6 is a conceptual diagram illustrating a road surface region that is estimated by a road surface estimator of the object detecting device according to Embodiment 1.

FIG. 6 is a conceptual diagram illustrating the road surface region estimated by road surface estimator 130, and indicates a disparity map generated by disparity map generator 120 and represented by three-dimensional data. The disparity map represented by the three-dimensional data is described as three-dimensional voxel data.

The disparity map represented by the three-dimensional data (i.e. three-dimensional voxel data) indicates data in a coordinate space that is represented by each coordinate (pixel) having the X-axis and Y-axis and the axis of disparity, and each coordinate of the image has a piece of disparity data. The three-dimensional voxel data includes road surface region 601 (shaded portion) where a road surface is imaged, and region 602 (portion of vertical lines) where an object is imaged. Road surface estimator 130 estimates road surface region 601 (shaded portion in FIG. 6) as a single plane on the basis of the three-dimensional voxel data.

FIG. 6 illustrates region 602 where the object is imaged for convenience; however, road surface estimator 130 does not necessarily identify region 602 where the object is imaged because the disparity of an object distant from the camera is less accurate as explained later.

Road surface region 601 can be estimated by general image processing. For example, if a vehicle of interest in front of the host vehicle is significantly distant from the stereo camera, the road surface region occupies the largest area in the target image. Road surface estimator 130 can therefore estimate a plane having the most densely-distributed data in the three-dimensional voxel data to be road surface region 601 by a maximum likelihood estimation method. Road surface region 601 is represented by an equation defining the plane.

Although road surface estimator 130 estimates the road surface on the basis of the three-dimensional voxel data in the above description, projecting the three-dimensional voxel data on the plane consisting of the Y-axis and the axis of the disparity may enable the slope of the road surface (i.e. shaded portion) to be estimated as a camera installation angle.

Although road surface estimator 130 estimates the plane having the most densely-distributed data as a road surface by the maximum likelihood estimation method in the above description, the road surface may be estimated as a combination of multiple planes and curved surfaces.

(Object Candidate Location Extractor 140)

Object candidate location extractor 140 extracts a region of an imaged object candidate (hereinafter referred to as "object candidate region") on the basis of the disparity map generated by disparity map generator 120 and the road surface estimated by road surface estimator 130. That is, an object candidate is present in the object candidate region in the disparity map.

Figure 7:
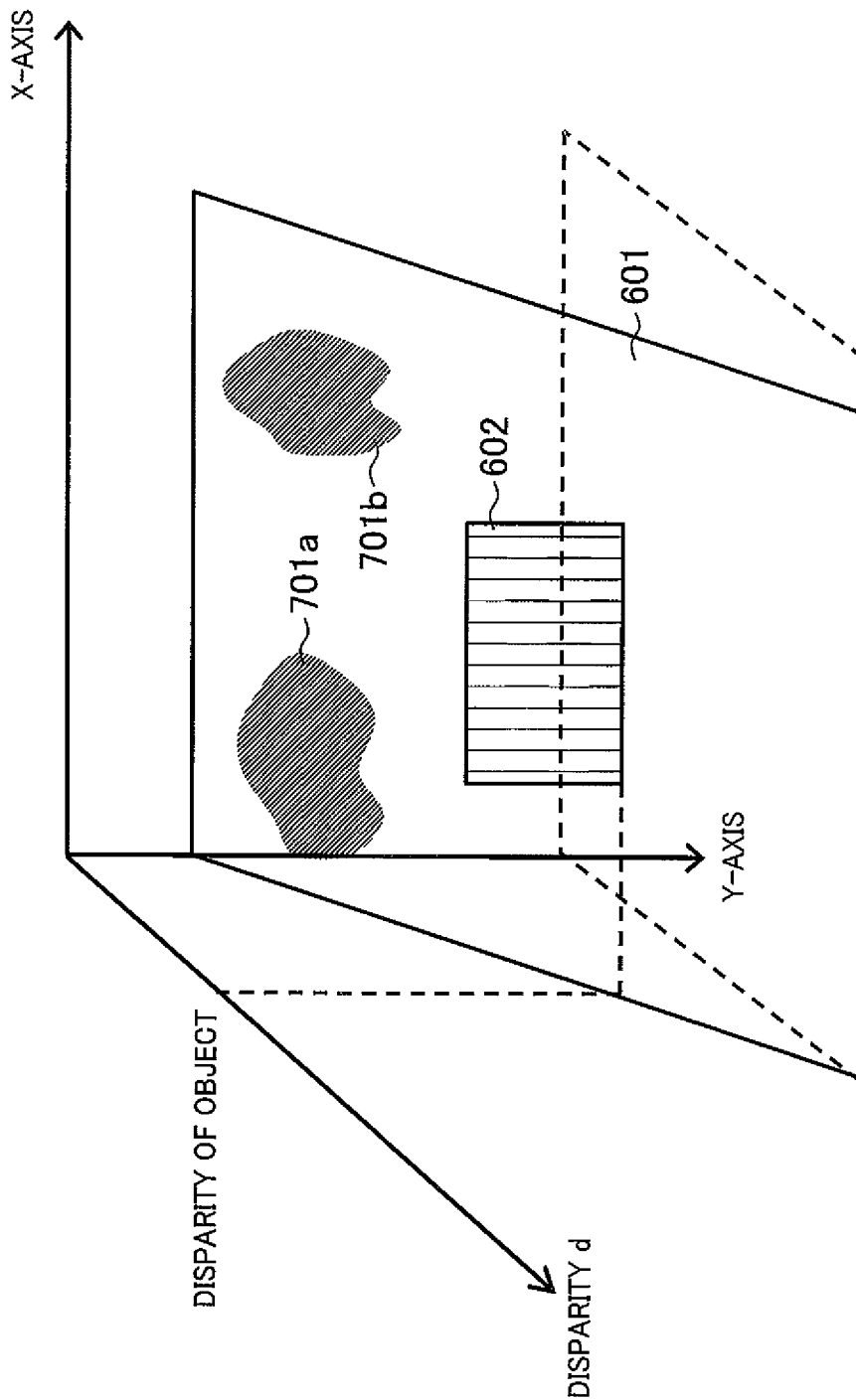
FIG. 7 illustrates a method of deleting disparity data below the road surface region in an object candidate location extractor of the object detecting device according to Embodiment 1.

FIG. 7 is a schematic view of the three-dimensional voxel data from which the disparity data below estimated road surface region 601 is deleted. Referring to FIG. 7, a method of deleting the disparity data below the road surface region in object candidate location extractor 140 will be explained.

The disparity data below road surface region 601 is the disparity data of the coordinate having a value of the Y-axis larger than the value of the Y-axis of the plane representing road surface region 601 in the three-dimensional voxel data. That is, at a position with an X-axis value of xi and a disparity d-axis value of di, the value Yr of the Y-axis of road surface region 601 at an coordinate (xi, di) and the value Yd of the Y-axis of the disparity data at the coordinate (xi, di) satisfy the relation: Yr+σ<Yd in the disparity data below road surface region 601, where σ is a value reflecting the unevenness of the road surface in a real space.

Thus, object candidate location extractor 140 deletes the disparity data below road surface region 601 from the three-dimensional voxel data to extract the disparity data above road surface region 601. The disparity data above road surface region 601 is the disparity data present at a higher position than road surface region 601 in the three-dimensional disparity map. That is, the location in the real space corresponding to the disparity data above road surface region 601 is present above the road surface in the real space.

The disparity data including object candidate region 602 is thus extracted. The disparity data above road surface region 601 may be extracted without deletion of the disparity data below road surface region 601. In this case, road surface region 601 may be estimated in the disparity map.

The disparity of a distant object is estimated with less accuracy due to the principle of triangulation, so that it is difficult to identify the disparity data of a distant road surface. For example, disparity data groups 701*a* and 701*b* shown in FIG. 7 are not estimated as road surface region 601 due to small disparity.

Figure 8:
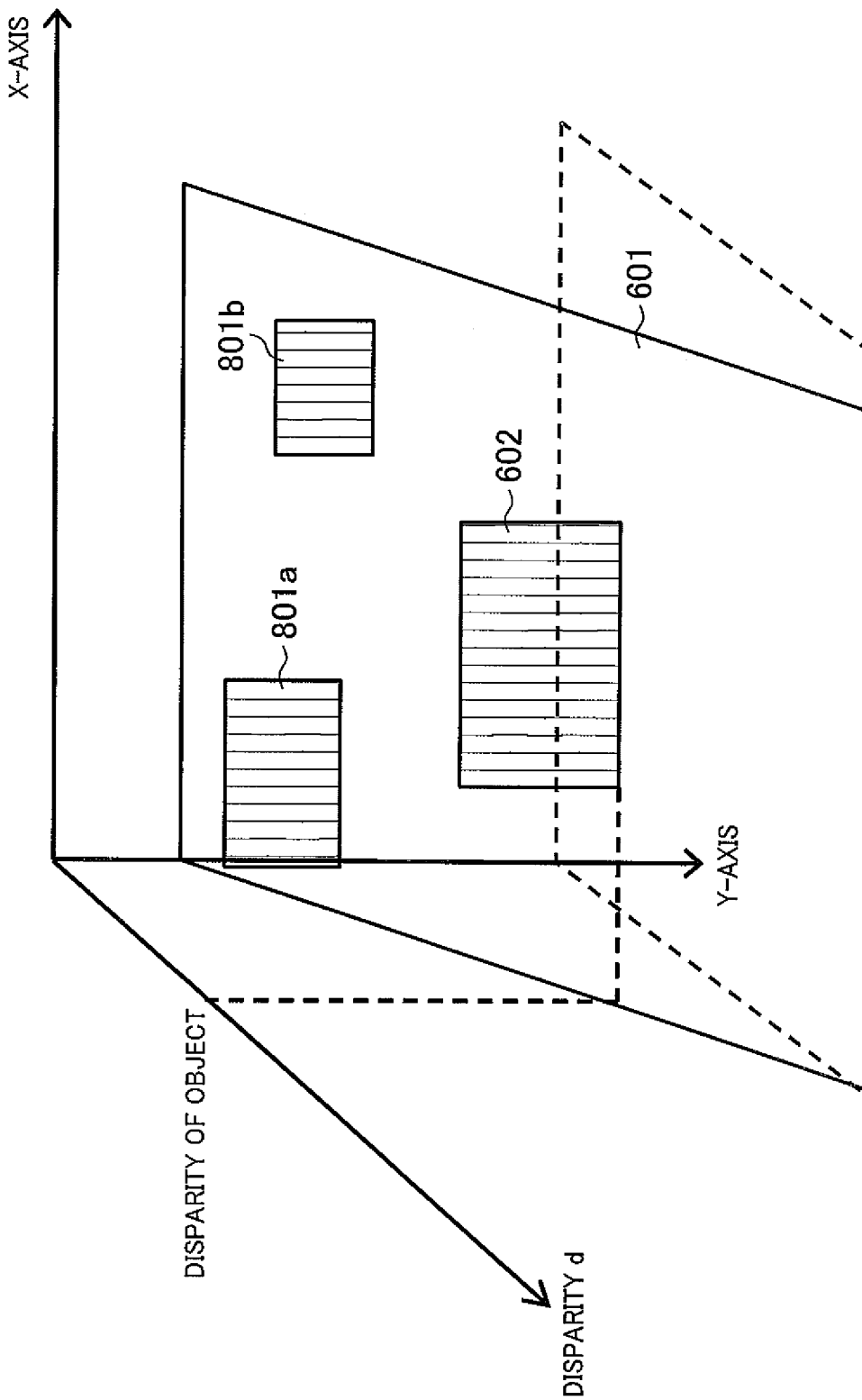
FIG. 8 illustrates a method of extracting an object candidate region in the object candidate location extractor of the object detecting device according to Embodiment 1.

FIG. 8 illustrates a method of extracting object candidate region 602 in object candidate location extractor 140. As shown in FIG. 7, object candidate location extractor 140 classifies pieces of the disparity data above road surface region 601 into a plurality of groups of the disparity data distributed adjacent to or in the vicinity of each other, where the groups are referred to as object candidate regions 801*a* and 801*b*. Object candidate location extractor 140 outputs coordinate information indicating the locations of the object candidate regions in the target image (referred to hereinafter as "object candidate location") to object identifying region extractor 150.

(Object Identifying Region Extractor 150)

Object identifying region extractor 150 receives the disparity map from disparity map generator 120, and extracts object identifying regions including the object candidate regions and their peripheral regions from the disparity map on the basis of object candidate locations as the coordinate information (location information) in the target image of the object candidate regions received from object candidate location extractor 140.

Figure 9:
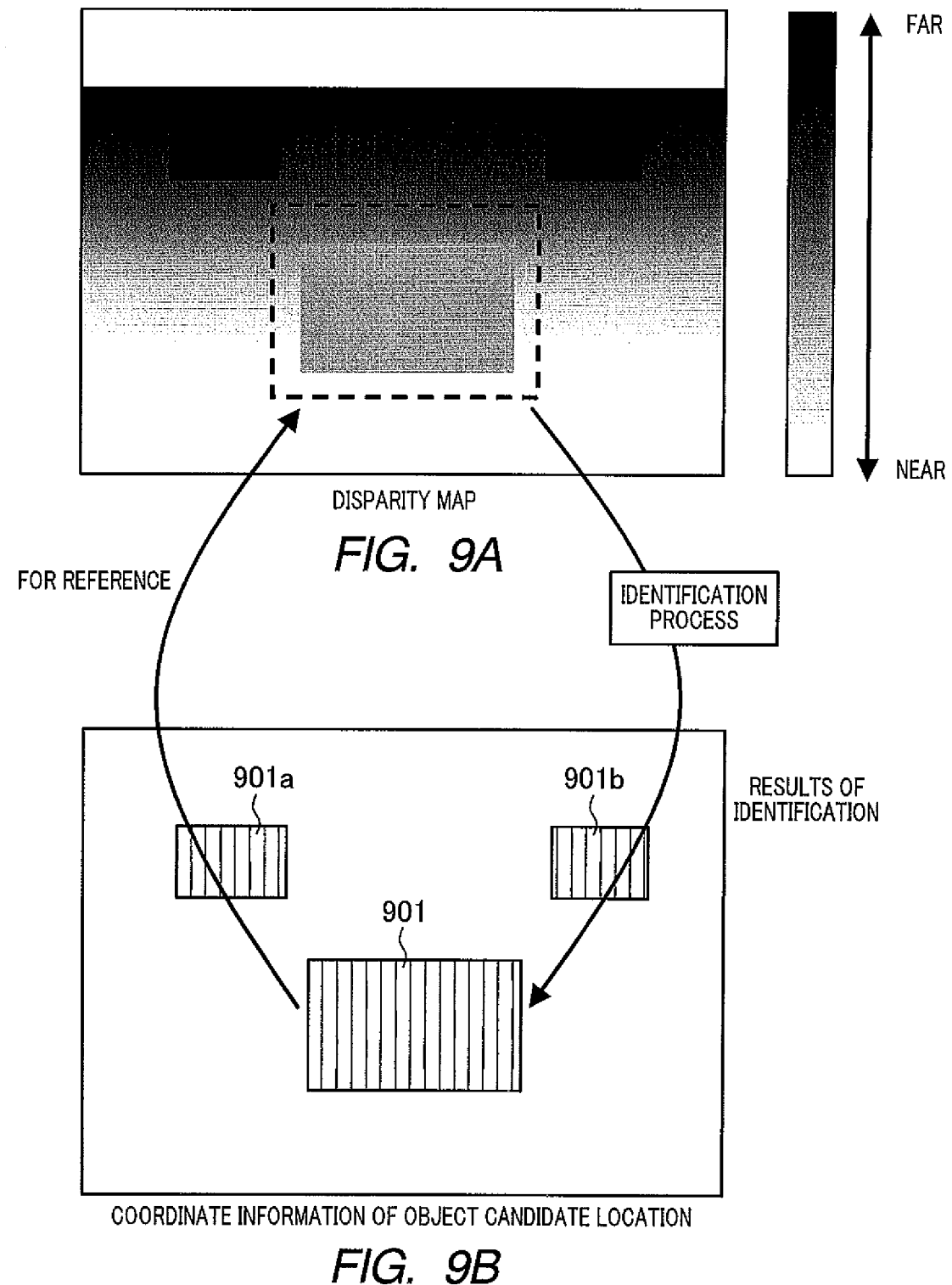
FIG. 9 is a conceptual view illustrating the process of an object identifying region extractor, a geometric feature extractor, and an object identifying unit of the object detecting device according to Embodiment 1.

FIG. 9 is a conceptual view illustrating the process of object identifying region extractor 150, feature extractor 160, and object identifying unit 170.

FIG. 9A indicates a disparity map that represents a disparity value with color depth. In FIG. 9A, a deeper color indicates a smaller disparity, i.e., a longer distance to the imaged target. FIG. 9B indicates the object candidate region to be identified as a real object or a road surface. Object identifying region extractor 150 extracts object identifying regions including object candidate regions 901 and the peripheral regions thereof. Feature extractor 160 extracts a geometric feature in the object candidate on the basis of the disparity data of the object identifying region extracted in object identifying region extractor 150. Object identifying unit 170 identifies the object candidate as a real object or a road surface on the basis of the geometric feature extracted by feature extractor 160 and the object determining parameters stored in object determining parameter memory 180.

Figure 10:
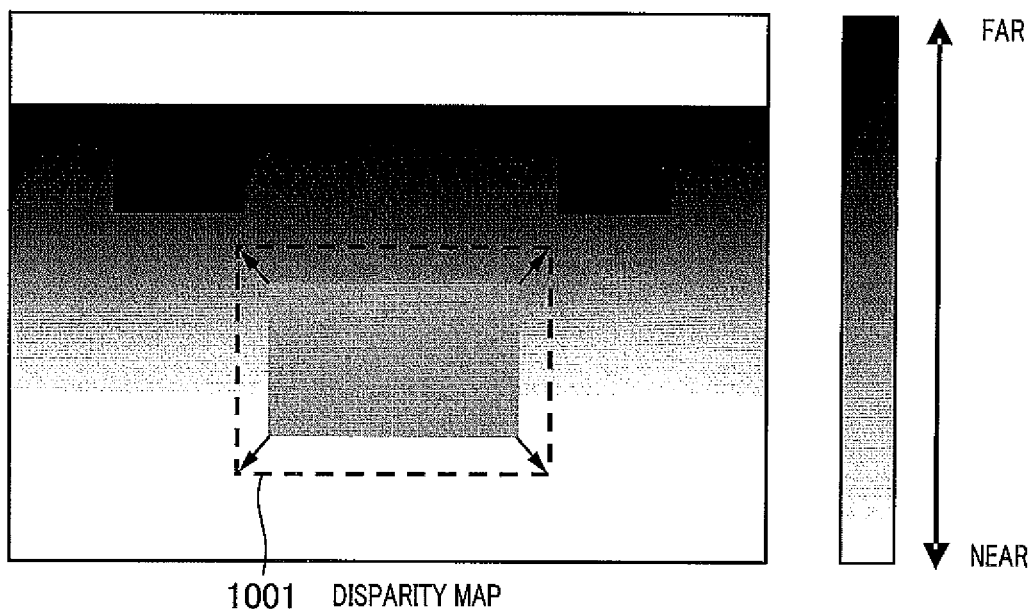
FIG. 10 illustrates a method of extracting an object identifying region in the object identifying region extractor of the object detecting device according to Embodiment 1.

FIG. 10 illustrates a procedure of extracting an object identifying region in object identifying region extractor 150. Object identifying region extractor 150 extracts object identifying region 1001 (region surrounded by a dashed line frame) including the object candidate and the peripheral region thereof. Object identifying region 1001 is a target region where the object candidate is identified as a real object or a road surface in the disparity map.

Determination of two distributions (on the object and road surface) having large variations on the basis of statistical learning requires an increased number of pixels of the object identifying region. An increase in the number of pixels in the object identifying region allows accurate image features to be extracted from the object identifying region. However, imaging of an object far from the stereo camera precludes extraction of the accurate image features from the object identifying region due to a small number of pixels in the region occupied by the object in the stereo image.

According to the embodiment of the present invention, use of a greater range of disparity data including the object candidate region and the peripheral region, in other words, use of the image features including the object and its background increases the accuracy of the identification. That is, identification by using both of the object candidate region and the background region uses not only an increased number of pixels but also an overall difference in brightness between the object candidate region and the background region and improves the accuracy of the identification, compared to using only the image features in the object candidate region.

When the object candidates are identified, targets to be identified as the object candidates (vehicle and road surface in the present embodiment) must be included in the object identifying region while objects, such as guardrails and trees on the roadside, other than the targets must be excluded therein. The widths of vehicles and roads are generally about 2.0 m and 3 m, respectively, and vehicles are not always running along the center of the road; hence, a region with a width of 2.5 m in the real space is defined as the object identifying region. That is, the object identifying region provided with the region 1.25 times wider than the object candidate region allows optimal identification in the scenes of many public roads. The determination of an object identifying region of 2.5 m width, which is 1.25 times wider than the object candidate region, is a matter of design choice, and the present invention is not limited to this example.

Thus object identifying region extractor 105 can determine the object identifying region on the basis of the size of the object candidate region.

Object identifying region extractor 105 can determine the object identifying region on the basis of the disparity value (distance value) and the size of the object candidate region. In such a manner, the accurate image features can be extracted even for an object distant from the stereo camera.

Alternatively, object identifying region extractor 105 can determine the size of object identifying region 1001 on the basis of the size of the object candidate in the real space. In such a case, object identifying region extractor 105 calculates the size of the object candidate in the real space on the basis of the size and the disparity value (distance value) of object candidate region 602. Object identifying region extractor 105 preliminarily stores the size information in the real space of objects (such as vehicles and persons) that may be present in a road environment, and compares the calculated size of the object candidate in the real space with the stored size information of the object to determine whether the object candidate is an object that can be present in the road environment. If the object candidate is determined to be an object that can be present in the road environment, the peripheral region of a first scale factor (e.g., 1.25 times) is extracted for object candidate region 602. If the object candidate is determined to be an object that cannot be present in the road environment, the peripheral region of a second scale factor (e.g., 1.5 times) is extracted for object candidate region 602. The second scale factor should be greater than the first scale factor. This is because the object candidate, such as a large falling object, which is not supposed to be an object that is present and moves autonomously in the road environment, and thus the object must be detected more accurately to prevent collision.

According to the above description, object identifying region extractor 105 calculates the size of the object candidate in the real space on the basis of the size and the disparity value of the object candidate region. Alternatively, object detecting device 100 may store a table (not shown) in advance associated with the size of the object candidate region, the distance value of the object candidate region and the size of the object identifying region. In such a case, object identifying region extractor 105 determines the size of the object identifying region from the size of the object candidate region with reference to the table.

Specifically, the size of the object candidate in the real space is defined on the basis of the size and the disparity value of the object candidate region. For example, if the size of the object candidate in the real space is included in a region 1.9 m wide and 1.6 m high, the object candidate is supposed to be a passenger car, and the size of the peripheral region in the real space is determined, for example, to be 2.0 m wide and 2.0 m high. The size of the peripheral region in the disparity map is determined uniquely on the basis of the size of the peripheral region in the real space and the disparity of the object candidate region. In this manner, the table stores the size and the disparity value of the object candidate region, and the size of the object identifying region corresponding thereto. Although the case of the passenger car is described herein, all objects supposed to be present in the road environment are defined in the table.

Figure 11A:
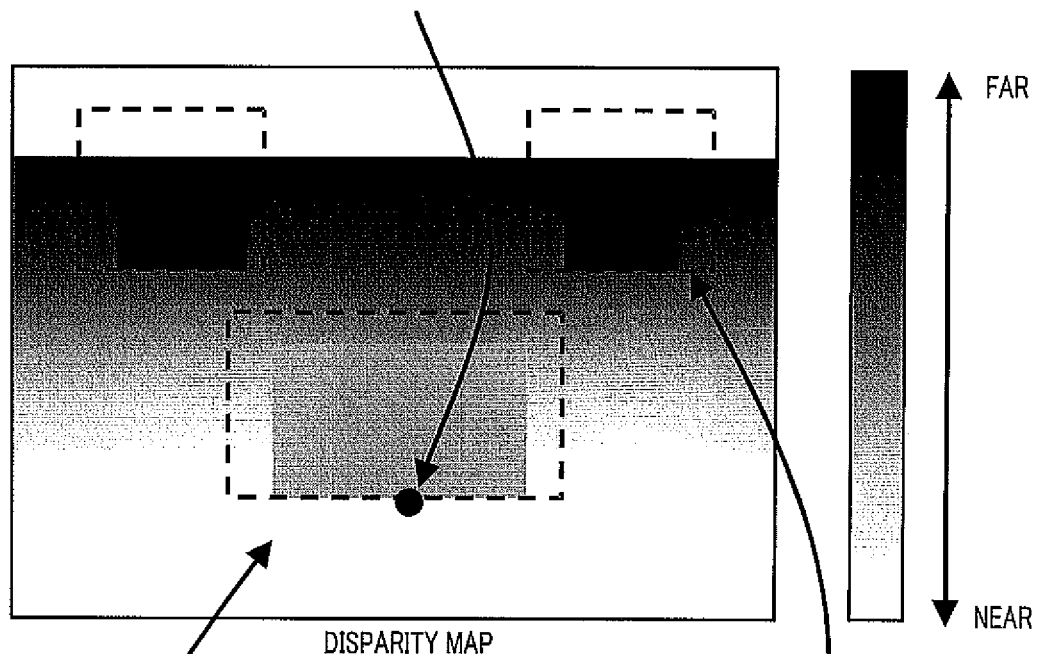
FIG. 11 illustrates a process of extracting an object identifying region in the object identifying region extractor of the object detecting device according to Embodiment 1.
Figure 11B:
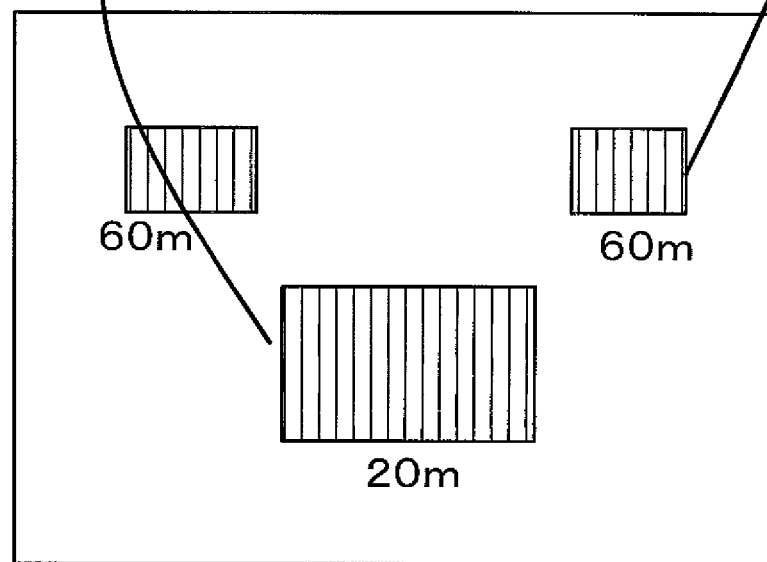

Although the object identifying region is described to be enlarged and extracted so as to include the peripheral region of the object identifying region, the bottom region may not be enlarged. FIG. 11 illustrates a process of extracting the object identifying region when no peripheral region is provided below the object candidate region. FIG. 11A illustrates the process of extracting the object identifying region from the disparity map, and FIG. 11B illustrates the object candidate location.

Object identifying region extractor 150 determines the size of the object identifying region according to the object candidate location in the disparity map. Object identifying region extractor 150 aligns the lower end position of the object identifying region with the lower end position of the object candidate region. The lower end position of the object candidate region is determined on the basis of the object candidate location in the road surface region estimated by road surface estimator 130. This is because the coordinate information of the road region estimated on the basis of the disparity map is more accurate due to a large number of data used for identification, compared to the object candidate location identified using local data such as displacement between the disparity calculating point in the target image and the corresponding point in the reference image.

In such a manner, determination of the lower end position of the object identifying region using the location information of the road surface region decreases the data volume below the lower end of the object candidate unnecessary to determine the object candidate and the road surface. Thus, the object and the road surface can be identified with a high accuracy. The data below the lower end of the object candidate, which provides the same shape regardless of the object or the road surface, results in low accuracy.

Herein, the lower end position of the object identifying region is determined using the coordinate information of the road surface. Alternatively, the lower end position of the object identifying region can be determined using the coordinate information of the object candidate.

In the above description, the size of the object identifying region is determined on the basis of the disparity value (distance value) of the object candidate region, the size of the object candidate region and the table stored in advance. Alternatively, the size of the object identifying region may be determined on the basis of the size of the object candidate region. In such a case, the size of the object identifying region can be dynamically changed depending on the distance between a target to be detected and a stereo camera.

Specifically, if the object candidate is a vehicle, the size in the disparity map of the region corresponding to a width of 2.0 m and a height of 2.0 m as a common size of the vehicle is calculated on the basis of the distance between the stereo camera and the object candidate, and the calculated size is defined as the size of the object identifying region. For example, the object identifying region with a width of 20 pixels and a height of 20 pixels is extracted for the vehicle at a distance of 80 m from the stereo camera, while the object identifying region with a width of 40 pixels and a height of 40 pixels is extracted for the vehicle at a distance of 40 m from the stereo camera.

(Feature Extractor 160)

Feature extractor 160 extracts a geometric feature vector from the object identifying region extracted by object identifying region extractor 150. The geometric feature vector means a vector quantity representing the feature of a three-dimensional shape such as flatness and convexity of the object candidate in the object identifying region.

Figures 12A, 12B:
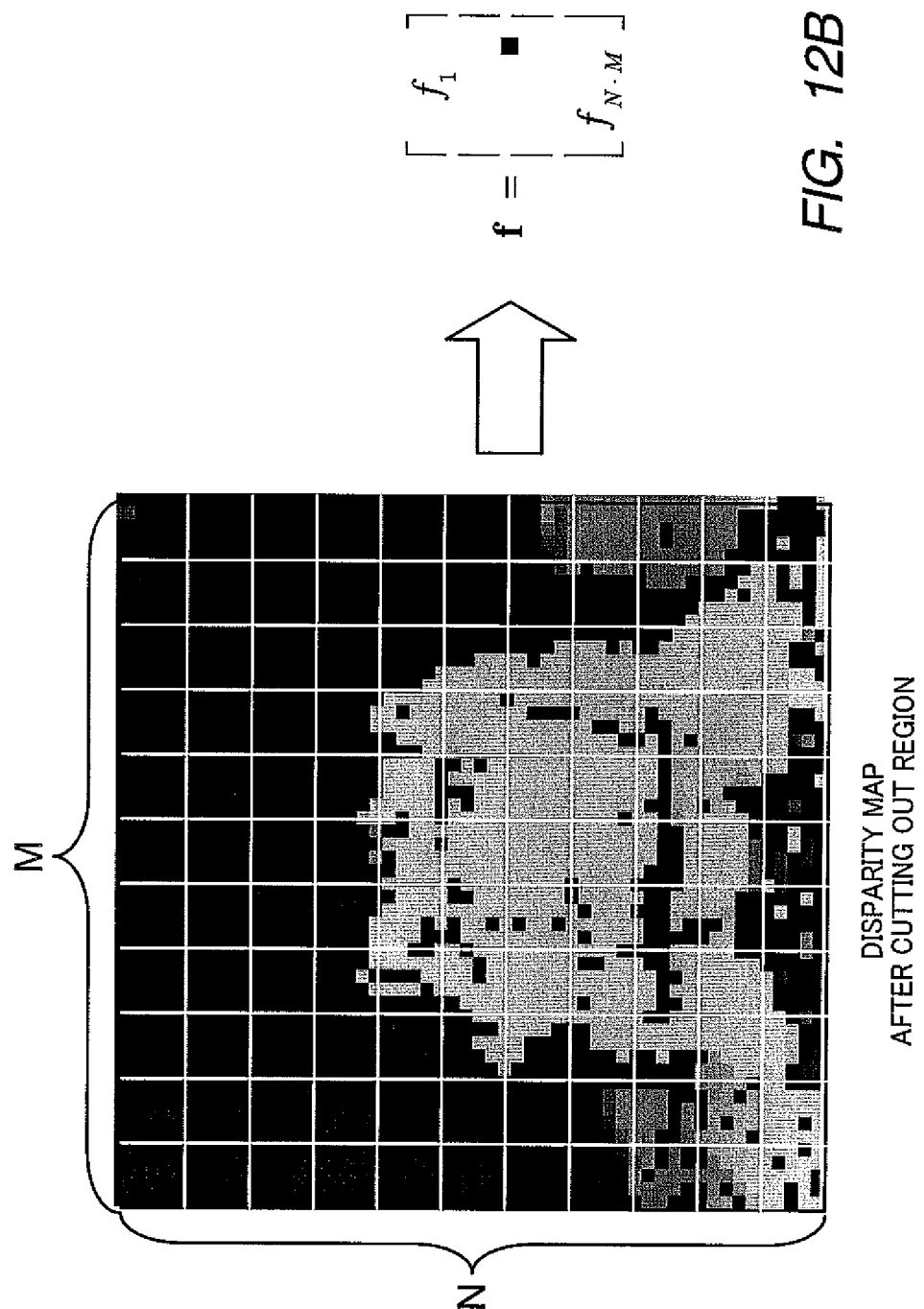
FIG. 12 illustrates a method of extracting a geometric feature in a feature extractor of the object detecting device according to Embodiment 1.

FIG. 12A illustrates a method of extracting a geometric feature in feature extractor 160. Feature extractor 160 divides the object identifying region into a grid of squares, and defines the representative values of the disparity data of the grid of squares as the geometric feature vectors, where the representative value of the disparity data is, for example, a mean or intermediate value of the disparity data included in each square in the grid.

FIG. 12B illustrates the geometric feature vector. Object identifying region extractor 150 divides the object identifying region into a grid composed of "N" columns in the vertical direction and "M" rows in the horizontal direction of the image, and calculates the N×M two-dimensional data elements, each being the representative value of the disparity in each square in the grid. Object identifying region extractor 150 rearranges the calculated two-dimensional data into one-dimensional data to create the geometric feature vector.

(Object Identifying Unit 170)

Object identifying unit 170 acquires the extracted geometric feature vector from feature extractor 160 and acquires object determining parameters learned in advance from object determining parameter memory 180.

Here, the object determining parameters are data including the vector quantity and the threshold for converting the geometric feature vector extracted by feature extractor 160 into a binary value of a real object or a road surface.

FIG. 13 illustrates a method of learning object determining parameters stored in object determining parameter memory 180.

FIG. 13A illustrates the learning of the object determining parameters stored in object determining parameter memory 180. The object determining parameters to identify whether what is present in the object candidate region is a real object or a road surface is calculated through statistical learning of a collection of several hundred to several thousand geometric feature vectors extracted from the disparity data of objects and a collection of several hundred to several thousand geometric feature vectors extracted from the disparity data of road markings that are present on roads and are prone to wrong detection. The calculated object determining parameters are stored in advance in object determining parameter memory 180.

A process of extracting the geometric feature vector from the disparity data of the object in learning of the object determining parameters is the same as that in feature extractor 160.

A process of extracting the disparity data region of the object in learning of the object determining parameters is also the same as that in object identifying region extractor 150.

Object identifying unit 170 identifies the object candidate as a real object or a road surface on the basis of the geometric feature vector from feature extractor 160 and the object determining parameters from object determining parameter memory 180. A general scheme such as discriminant analysis and a support vector machine (SVM) can be applied as a learning and identification scheme to the present invention without limitation.

The disparity based on a stereo image precludes estimation of the disparity of a region containing reduced amounts of high-frequency components, i.e., small changes in edge and brightness, in the image, and thus regions that lack disparity data in the object identifying region occur. Since the image obtained by capturing a vehicle has especially many regions where reduced amounts of high frequency components are present, regions that lack disparity data may occur. For example, a typical pattern (referred to hereinafter as a "disparity pattern") capable of estimating the disparity data is an "H-type" viewed from the rear of the vehicle. In detail, the disparity data is present in the regions of left and right edges of the rear of the vehicle, a license plate, and taillights, whereas the disparity data is missing in the regions of the top center and the lower center of the vehicle due to reduced amounts of high frequency components.

If a scheme is employed that determines no object candidate can be detected when the disparity data far from the representative disparity (i.e., the mean value of the disparity in the object candidate region) of the object candidate exceeds a threshold, an object that is prone to lacking disparity data such as a vehicle may be undetected.

Figure 14:
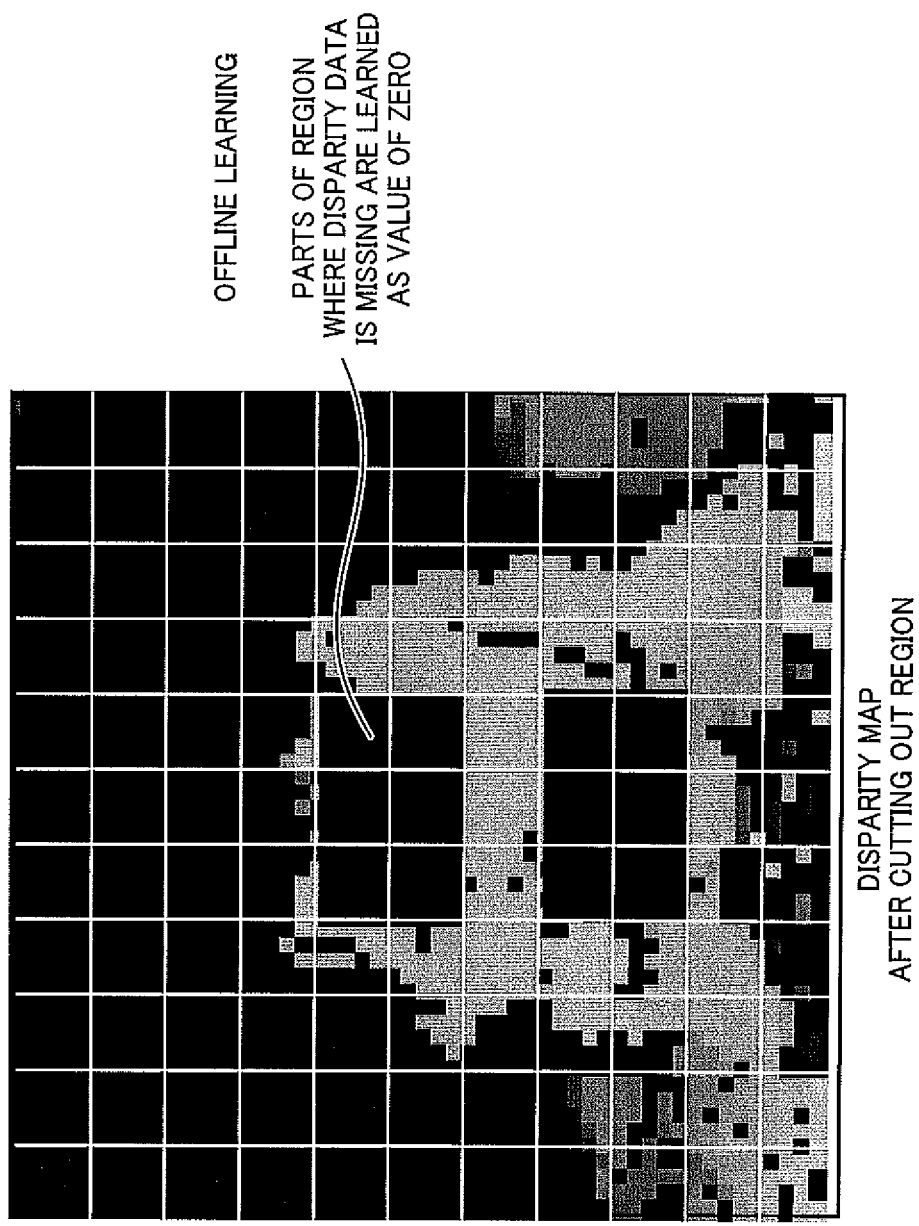
FIG. 14 shows an object identifying region that lacks disparity data in parts of a region according to Embodiment 1.

In the present invention, the object candidate is identified as a real object or a road surface also using the disparity pattern. FIG. 14 illustrates object identifying regions, parts of which lack the disparity data. In such a case, the disparity values of the regions that lack the disparity data of the object are treated as zero. Similarly, the object determining parameters are learned using the disparity data of objects and road markings; if the disparity data is missing in parts of the regions of the disparity data of objects or road markings for learning, the disparity values of the regions that lack the disparity data are also treated as zero.

The image of the road surface, which also has reduced amounts of high frequency components, can be accurately identified with the disparity pattern. Although the region that lacks disparity data cannot be identified by a scheme that identifies a real object or a road surface on the basis of the slope or the standard deviation of the disparity, the invention enables the accurate identification using the object determining parameters after learning, including the disparity pattern.

In a stereo camera mounted on a vehicle, the object candidate locations in the stereo images are more likely to be vertically displaced due to a variable pitch of the vehicle. FIG. 15 illustrates learning of the object determining parameters stored in object determining parameter memory 180 by dealing with vertical displacements. In order to make a robust determination with regard to the vertical displacements, the disparity data the lower ends of which are displaced up and down in the range of 10 pixels is added before learning to the disparity data for use in learning the object determining parameters. Thus, more robust identification against the vertical displacements can be carried out.

As described in detail above, object detecting device 100 according to the present invention includes disparity map generator 120 for generating a disparity map on the basis of acquired stereo images, and road surface estimator 130 for identifying a road surface on the basis of the generated disparity map. Object detecting device 100 also includes object candidate location extractor 140 for extracting an object candidate location above the road surface in a real space on the basis of the generated disparity map and the road surface, and object identifying region extractor 150 for extracting a three-dimensional identifying region including peripheral regions of the object candidate from the generated disparity map. Object detecting device 100 further includes feature extractor 160 for extracting a geometric feature of the object candidate on the basis of an object identifying region, and object identifying unit 170 for identifying the object candidate as a real object or a road surface on the basis of the extracted geometric feature and object determining parameters stored in advance in an object determining parameter memory 180.

A method of detecting an object involves acquiring stereo images captured by imaging systems, generating a disparity map on the basis of the stereo images, and identifying a road surface on the basis of the disparity map. The method also involves extracting an object candidate location present above the road surface in the real space on the basis of the disparity map and the road surface and extracting an object identifying region including peripheral regions of the object candidate region from the disparity map. The method further involves extracting the geometric feature of the object candidate from the extracted object identifying region and identifying the object candidate as a real object or a road surface on the basis of the geometric feature and object determining parameters.

The extraction of the object identifying region including the peripheral region of the object candidate region or the disparity data for use in learning leads to the use of image features including an object and its background, resulting in high accuracy of identification. Identification using both of the object candidate region and the background region improves the accuracy of the identification due to an increase in the number of pixels and use of the overall difference in brightness value between the object candidate region and the background region improves, compared to identification using only the image features in the object candidate region.

In this manner, even distant objects that cannot be readily identified as objects or road surfaces (road markings) can be detected with a high accuracy. This is effective, in particular, for a stereo camera having a short base length and for the detection of distant objects.

In the present embodiment, the following configuration of object identifying region extractor 150, feature extractor 160, and object identifying unit 170 has a specific effect.

If object identifying region extractor 150 is configured to vary the size of the object identifying region to be extracted depending on the distance to an object candidate, the object determining parameters no longer need to be stored every distance to the object candidate, which can reduce the memory size.

Object identifying region extractor 150 aligns the lower end of the object candidate region with the lower end of the object identifying region, so that the disparity data of targets below the lower end of the object candidate in a real space is not used. This leads to the use of the accurate geometric feature of objects and road surfaces, resulting in high accuracy of identifying the objects or the road surfaces (road markings).

Feature extractor 160 divides the object identifying region into a grid of squares and defines the representative values of the disparity data of the grid of squares as the geometric feature vectors. This enables the objects and the road surfaces (road markings) to be correctly identified in a more robust manner even if the disparity data is partially missing in the object identifying region.

Object identifying unit 170 can identify a real object or a road surface (road markings) with a high accuracy from the results of the statistical learning of the geometric feature.

Object identifying unit 170 uses geometric features having a disparity value of zero as the results of learning if no disparity data is present to identify a real object or a road surface (road markings) with a high accuracy even if the object and the road surface containing reduced amounts of high frequency components lack the disparity data.

Object identifying unit 170 uses a large number of disparity data sets on a region displaced vertically for learning the object determining parameters to identify a real object or a road surface (road markings) with a high accuracy even in an automotive environment associated with a large pitch variation.

Embodiment 2

FIG. 16 illustrates an extraction process based on correlation features in the feature extractor of the object detecting device according to Embodiment 2 of the present invention.

The feature extractor according to the present embodiment is used in place of geometric feature extractor 160 of object detecting device 100 in FIG. 2. The basic configuration and operation of the object detecting device according to Embodiment 2 of the present invention is similar to those of Embodiment 1.

FIG. 16A shows the extraction process of the correlation features, and FIG. 16B indicates a geometric feature vector based on the correlation features. As shown in FIG. 16, the geometric feature extractor according to the present embodiment divides the object identifying region into a grid of squares, and generates the geometric feature vector on the basis of the correlation of the representative value of the disparity data of each square in the grid.

The feature extractor divides the object identifying region into a grid composed of "N" columns in the vertical direction and "M" rows in the horizontal direction of the image, and calculates the N×M two-dimensional data elements, each being the representative value of the disparity data in each square in the grid. Geometric feature extractor extracts the correlation features to generate the geometric feature vector. The correlation features determined, for example, on the basis of the number of bit patterns 1601 for extraction of the correlation features consisting of a given number (i.e. "L") of 3×3 pixels in the N×M two-dimensional data obtained by binarizing the representative value of the disparity data of each square in the grid.

The object determining parameters stored in the object determining parameter memory are also calculated on the basis of the correlation features extracted from the disparity data for learning of objects.

In such a manner, the feature extractor of the object detecting device according to the present embodiment divides the object identifying region into a grid of squares, and defines the geometric feature based on the correlation value of the representative value of the disparity data of each grid regions as the geometric feature vector to extract the geometric feature representing the correlation on the disparity data. Thus, the geometric feature that is more robust against the displacements of the object identifying region can be extracted, which enables the objects and the road surfaces (road markings) to be correctly identified with a higher accuracy.

Each element of the geometric feature vector is defined as a mean of the disparity data in each grid region; however, this embodiment should not be intended to limit the present invention. For example, an intermediate value of the disparity data can also be used.

The description above includes preferred illustrative embodiments of the present invention, and the scope of the invention should not be limited to the embodiments set forth herein.

Each embodiment described above can be implemented in combination with any additional information providing means, such as sound, audio information, or vibration.

Furthermore, each unit included in the above object detecting device such as the type of the stereo image acquiring unit and the estimation process of the disparity map generator are not limited to the embodiments described above.

The method of detecting an object described above is achieved by a program to activate the method of detecting an object, where the program is stored in a computer-readable recording medium.

INDUSTRIAL APPLICABILITY

The device and method of detecting an object according to the present invention have a function of detecting a distant target that cannot be readily identified as a real object or a road surface (road markings) using the stereo images; therefore, they are useful for supporting such as preceding vehicle follow-ups.

REFERENCE SIGNS LIST

10: Object detecting device
11: Stereo image acquiring unit
12: Disparity map estimator
13: Road surface estimator
14: Object candidate location extractor
15: Slope calculating and determining unit
100: Object detecting device
110: Stereo image acquiring unit
120: Disparity map generator
130: Road surface estimator
140: Object candidate location extractor
150: Object identifying region extractor
160: Geometric Feature extractor
170: Object identifying unit
180: Object determining parameter memory
601: Road surface region
602: Object candidate region
701: Object candidate region
801: Object candidate region
901: Object candidate region
1001: Object identifying region
1601: Bit pattern for extraction of correlative feature

The invention claimed is:

1. An object detecting device that detects an object on a road surface included in stereo images, comprising:
    a disparity map generator that generates a disparity map on the basis of the stereo images;
    a road surface estimator that estimates a road surface region on the basis of the disparity map;
    an object candidate location extractor that extracts pieces of disparity data above the road surface region from the disparity map, as an object candidate region where an object candidate is present;
    an object identifying region extractor that extracts an object identifying region from the disparity map, the object identifying region including the object candidate region and having a width larger than the width of the object candidate region by a predetermined scale factor;
    a geometric feature extractor that extracts a geometric feature in the object identifying region; and
    an object identifying unit that identifies whether the object candidate is an object or a road surface on the basis of the geometric feature.

2. The object detecting device according to claim 1, further comprising a table that associates the size and the disparity value of the object candidate region with the size of the object identifying region, wherein:
    the object identifying region extractor extracts the object identifying region from the disparity map on the basis of the table and the size of the object candidate region.

3. The object detecting device according to claim 1, wherein:
    the object identifying region extractor calculates the size of the object candidate region in a real space on the basis of the disparity value and the size of the object candidate region,
    determines whether the object candidate is a possible object that is present in a road environment on the basis of the calculated size of the object candidate region in the real space and preliminarily stored size information of possible objects that are present in the road environment in the real space,
    extracts the object identifying region where the predetermined scale factor is a first scale factor when the object candidate is determined to be the possible object that is present in the road environment, and
    extracts the object identifying region where the predetermined scale factor is a second scale factor when the object candidate is determined not to be the possible object that is present in the road environment.

4. The object detecting device according to claim 3, wherein the first scale factor is smaller than the second scale factor.

5. The object detecting device according to claim 1, wherein the lower end of the object identifying region is aligned with the lower end of the object candidate region.

6. The object detecting device according to claim 1, wherein the predetermined scale factor is determined depending on the distance to the object candidate.

7. The object detecting device according to claim 1, wherein the geometric feature extractor divides the object identifying region into a grid of squares to generate the geometric feature vector on the basis of representative values of the disparity data of each grid of squares.

8. The object detecting device according to claim 1, wherein the geometric feature extractor divides the object identifying region into a grid of squares to generate the geometric feature vector on the basis of a correlation of representative values of the disparity data of each grid of squares.

9. The object detecting device according to claim 1, wherein the object identifying unit performs identification using a result of learning based on a statistical learning.

10. The object detecting device according to claim 9, wherein the object identifying unit performs the identification using a result of learning vertical displacements.

11. The object detecting device according to claim 1, wherein the object identifying unit performs identification using the disparity value of zero when the object identifying region has parts where the disparity data is missing.

12. An object detecting method that detects an object on a road surface included in stereo images, comprising:

generating, by a disparity map generator, a disparity map on the basis of the stereo images;

estimating, a road surface estimator, a road surface region on the basis of the disparity map;

extracting, an object candidate location extractor, pieces of disparity data above the road surface region from the disparity map, as an object candidate region where an object candidate is present;

extracting, an object identifying region extractor, an object identifying region from the disparity map, the object identifying region including the object candidate region and having a width larger than the width of the object candidate region by a predetermined scale factor;

extracting, by a geometric feature extractor, a geometric feature in the object identifying region; and identifying, by an object identifying unit, whether the object candidate is an object or a road surface on the basis of the geometric feature.

13. A computer executing a program for causing the computer to perform the steps of the object detecting method according to claim 12.

\* \* \* \* \*